United States Patent [19]

Atwell et al.

[11] Patent Number: 5,358,910
[45] Date of Patent: Oct. 25, 1994

[54] POROUS SILICON CARBIDE CERAMICS USING FILLED POLYSILOXANES

[75] Inventors: William H. Atwell; Chandan K. Saha; Gregg A. Zank, all of Midland, Mich.

[73] Assignee: Dow Corning Corporation, Midland, Mich.

[21] Appl. No.: 122,985

[22] Filed: Sep. 20, 1993

Related U.S. Application Data

[62] Division of Ser. No. 55,892, May 3, 1993, Pat. No. 5,283,019.

[51] Int. Cl.$^5$ ............................................. C04B 35/56
[52] U.S. Cl. ........................................ 501/88; 501/80; 501/90; 501/85
[58] Field of Search ..................... 501/88, 80, 90, 85

[56] References Cited

U.S. PATENT DOCUMENTS 4,891,340  1/1990  Semen et al. .......................... 501/88

Primary Examiner—Mark L. Bell
Assistant Examiner—C. M. Bonner
Attorney, Agent, or Firm—Roger E. Gobrogge

[57] ABSTRACT

The preparation of porous ceramic bodies by sintering certain curable organopolysiloxanes filled with silicon carbide powders. This process is advantageous in that the green bodies have relative high strengths and thus can be easily handled and, if desired, machined before sintering.

1 Claim, No Drawings

POROUS SILICON CARBIDE CERAMICS USING FILLED POLYSILOXANES

This is a divisional of copending application Ser. No. 08/055,892 filed on May 3, 1993, now U.S. Pat. No. 5,283,019 issued Feb. 1, 1994.

BACKGROUND OF THE INVENTION

This invention relates to the preparation of porous ceramic bodies by the pyrolysis of curable organopolysiloxanes filled with silicon carbide powders and, optionally, organopolysiloxane curing agents and sintering aids. This process is advantageous in that both the green bodies and the resultant ceramics have high strengths.

Various methods for the production of porous silicon carbide ceramic bodies are known in the art. For instance, it is known to mold mixtures of large particle size silicon carbide and smaller size silicon carbide into a desired shape followed by pyrolyzing the molded mixture to form a ceramic. The particle size variation in this approach creates the desired pores. Similarly, it is known to mold a mixture comprising a carbonaceous binder, silicon carbide powder and a silaceous powder into the desired shape followed by pyrolysis. In this approach, the carbon formed by pyrolysis of the carbonaceous binder reacts with the silaceous binder to form silicon carbide, thus, leaving pores in the sinter. Neither of these approaches, however, encompasses the use of organopolysiloxanes as binders to form porous ceramics.

Suganuma et al. in the journal of Materials Science, 28 (1993) pp. 1175–1181, teach the formation of porous silicon carbide bodies by pyrolyzing a mixture of SiC powder, polysilastyrene and an organic binder. The reference, therefore, differs from the present invention in that it requires the use of an organic binder and it does not mention the use of polyorganosiloxanes.

Atwell et al. in U.S. Pat. No. 4,888,376 teach that high density silicon carbide bodies ($>2.4$ g/cm$^3$) can be formed by molding a mixture comprising an organopolysiloxane, a sintering aid, an organopolysiloxane curing agent and silicon carbide powder and then heating the molded mixture to a temperature above about 1900° C. This reference, however, teaches that the bodies are highly densified compared to the high strength porous bodies described herein.

The present invention provides porous ceramic products using organopolysiloxanes as binders. Both the green bodies and the resultant ceramics have high strengths.

SUMMARY OF THE INVENTION

This invention relates to a method of preparing a porous silicon carbide ceramic body. The method comprises forming a mixture comprising silicon carbide powder, a preceramic organopolysiloxane, and, optionally, an organopolysiloxane curing agent and/or a sintering aid into a green body having the desired shape. The green body is then sintered in an inert atmosphere at a temperature sufficient to form a porous sintered body having a density less than 2.4 g/cm$^3$ and an open porosity greater than about 25%.

DETAILED DESCRIPTION OF THE INVENTION

The present invention is based on the unexpected discovery that mixtures of organopolysiloxanes and silicon carbide powder can be used to prepare high strength green bodies which can be fired to form high strength, monolithic, porous ceramic bodies. This was particularly unexpected since the prior art does not teach the use of organopolysiloxanes in the formation of porous ceramics nor the formation of the high strength bodies claimed herein.

The sintered bodies produced from the practice of this invention have controlled open porosity (greater than about 25%), low firing shrinkage with low shrinkage variation, a unique pore and grain morphology, high modulus and high strength (often above 25 ksi (ksi=kpsi=1000 pounds per square inch)), and good oxidation and corrosion resistance. The density of these materials is less than about 75% of the theoretical density of silicon carbide (3.21 g/cm$^3$), i.e., densities less than about 2.4 g/cm$^3$. As such, these materials are useful, for example, as high temperature filters, as supports for catalysts in chemical reactions and in structural applications where high strength porous bodies are required.

The high green strength obtained by the process of the present invention is a significant advantage which allows the green bodies to be handled and further processed prior to the final sintering or pyrolysis step. Generally, green strengths of 500 psi or more may be obtained in the practice of this invention. Additionally, the green body may be cured prior to sintering to obtain even stronger green bodies.

The mixtures used to prepare the porous bodies of the present invention comprise an organopolysiloxane filled with silicon carbide powder and, optionally, an organopolysiloxane curing agent and/or a sintering aid. According to the invention, this mixture is molded into the desired shape and pyrolyzed. To prevent densification during the pyrolysis and, thus, provide a porous body, the present inventors have discovered that it is necessary to control either the composition of the mixture or the processing conditions. This can include selecting an organopolysiloxane which produces limited amounts of free carbon, limiting the amount of sintering aid and/or limiting the pyrolysis temperature, each of which is described hereinafter. By taking these steps, the desired porous bodies are formed.

The organopolysiloxanes useful herein are generally well known in the art. The primary requirement of such polymers is their capability of being converted to ceramic materials with a ceramic char yield greater than about 20 weight percent (the ceramic char is that material remaining after pyrolysis of the organopolysiloxane to 1800° C. and the ceramic char yield is the weight percent of ceramic char compared with the weight of organopolysiloxane pyrolyzed). However, since there is less shrinkage with higher char yield polymers, it is preferred that organopolysiloxanes having char yields greater than about 40 weight percent be employed.

The organopolysiloxanes used herein should also generally yield a ceramic char having at least a stoichiometric amount of silicon and carbon. Organopolysiloxanes which produce silicon rich chars (i.e., greater than a stoichiometric amount of silicon) are generally not useful as they result in ceramic bodies having lower strengths and poor oxidation resistance. Organopolysiloxanes which produce carbon rich chars (i.e., greater than a stoichiometric amount of carbon) may be used herein. However, if the amount of free carbon (i.e., that amount of carbon above the stoichiometric amount in SiC) produced by such polymers is greater than about 0.1 wt % based on the weight of the ceramic char and the silicon carbide powder, care must be taken to either limit the addition of sintering aid to less than about 0.1 wt. %, limit the final firing temperature to about 1800° C. or below or add a material which can eliminate the excess free carbon (e.g., a source of oxygen so that the carbon will be eliminated as CO, a source of silicon so that the free carbon will form SiC, etc.). Organopolysiloxanes which produce chars with less than about 0.1 wt. % free carbon based on the weight of the ceramic char and the silicon carbide powder can be mixed with sintering aids and fired to nearly any desired temperature. Generally, the amount of free carbon should be less than about 10 wt. %.

As long as the organopolysiloxane can be converted to a ceramic char with sufficient char yield and the desired silicon and carbon stoichiometry, its structure is not critical. The organopolysiloxane may, for example, contain units selected from the group consisting of $[R_3SiO_{0.5}]$, $[R_2SiO]$, $[RSiO_{1.5}]$, and $[SiO_2]$, where each R is independently selected from the group consisting of hydrogen, alkyl radicals containing 1 to 20 carbon atoms such as methyl, ethyl, propyl, butyl, etc., phenyl radicals, and vinyl radicals. Organopolysiloxanes which contain vinyl groups are often preferred since vinyl groups attached to silicon provide a mechanism whereby the organopolysiloxane can be cured prior to sintering. Preferred organopolysiloxanes contain varying amounts of $[PhSiO_{1.5}]$, $[MeSiO_{1.5}]$, $[Me_2SiO]$, $[Me_3SiO_{0.5}]$, $[MeViSiO]$ and $[Me_2ViSiO_{0.5}]$ units (Me=methyl, Vi=vinyl and Ph=phenyl). Especially preferred organopolysiloxanes are described by the unit formula

where there are 0 to 90 mole percent $[PhSiO_{1.5}]$ units, 0 to 90 mole percent $[MeSiO_{1.5}]$ units, and 0 to 70 mole percent $[Me_2ViSiO_{0.5}]$ units. Organopolysiloxanes useful in this invention may contain other siloxane units in addition to, or in place of, the siloxane units just mentioned. Examples of such siloxane units include $[ViSiO_{1.5}]$, $[PhMeSiO]$, $[MeHSiO]$, $[PhViSiO]$, $[Ph_2SiO]$, and the like. Mixtures of organopolysiloxanes may also be employed.

The organopolysiloxanes of this invention can be prepared by techniques well known in the art. The actual method used to prepare the organopolysiloxanes is not critical. Most commonly, the organopolysiloxanes are prepared by the hydrolysis of organochlorosilanes or organoalkoxysilane. Such methods, as well as others, are described in Noll, *Chemistry and Technology of Silicones*, chapter 5 (translated 2d Ger. Ed., Academic Press, 1968). Specific methods for preparation of suitable organopolysiloxanes are also illustrated in the examples included in the present specification.

Generally, the amount of organopolysiloxane used in the present invention will depend on factors such as the method of molding, the desired porosity and the desired green strength. Amounts of between about 0.1 and about 50 wt. percent based on the weight of silicon carbide powder are usually used. Preferred amounts are usually in the range of between about 10 and about 30 wt. percent.

Other components in the mixtures of this invention include silicon carbide powder and, optionally, an organopolysiloxane curing agent and/or a sintering aid. The silicon carbide powders useful in this invention are well known in the art and commercially available. Both alpha-SiC and beta-SiC powders, as well as mixtures, can be used. Generally, powder sizes less than about 10 microns are used. Preferred powder size is in the range of about 0.1 to about 5 microns.

The mixtures used in the process of this invention may, optionally, also contain organopolysiloxane curing agents. Such curing agents can be used to cure (crosslink) the shaped articles prior to sintering. Such cured articles generally have higher green strengths than the uncured articles and, thus, can better withstand any handling or machining processes prior to sintering. Conventional organopolysiloxane curing agents useful in the present invention are well known in the art. Examples include heat (e.g., 50°-300° C.) activated crosslinking initiators such as organic peroxides, e.g., dibenzoyl peroxide, bis-p-chlorobenzol peroxide, bis-2,4-dichlorobenzol peroxide, di-t-butyl peroxide, dicumyl peroxide, t-butyl perbenzoate, and t-butyl peracetate; and platinum-containing curing agents such as platinum, $H_2PtCl_6$, and $((C_4H_9)_3)_2PtCl_2$.

Various room temperature curing agents may also be used. For instance, polyfunctional organosilicon compounds such as Si-H functional silanes, silazanes or siloxanes will function effectively herein.

Preferred organopolysiloxane curing agents include dicumyl peroxide, t-butyl perbenzoate and polyfunctional organosilicon crosslinking agents with Si-H functional groups. Other conventional organopolysiloxane curing agents known in the art may also be used.

The organopolysiloxane curing agent, if used, is present in an effective amount, i.e. an amount sufficient to induce crosslinking in the organopolysiloxane. Therefore, the actual amount of the curing agent will depend on the activity of the actual agent used. Normally, however, the non-platinum curing agent will be present at about 0.1 to 5.0 weight percent based on the weight of the organopolysiloxane with the preferred level being about 2.0 weight percent. When the organopolysiloxane or organopolysiloxanes contain both vinyl groups and hydrogen atoms attached to silicon, platinum-containing curing agents can be used. For such platinum-containing curing agents, the level of curing agents will normally be such that platinum is present at about 1 to 1000 ppm based on the weight of the organopolysiloxane with the preferred level at about 50 to 150 ppm platinum. Polyfunctional organosilicon compounds are generally used in an amount of between about 0.1 and about 5 wt. % based on the weight of the organopolysiloxane.

Other additives may also be used in the mixture of the present invention. For instance, processing aids such as lubricants, deflocculants and dispersants may be used herein. Examples of these materials include stearic acid, mineral oil, paraffin, calcium stearate, aluminum stearate, succinic acid, succinimide, succinic anhydride or various commercial products such as Aloa 1200 ™.

Additionally, sintering aids may also be included in this invention, if desired. If such agents are used, however, care must be taken to prevent densification of the ceramic as set forth herein. Suitable metal-containing sintering aids include iron, $Fe_3C$, magnesium, $MgC_3$, lithium, $Li_2C_2$, beryllium, $Be_2C$, boron, boron-containing compounds, aluminum, aluminum-containing compounds, and metal oxides such as thorium oxide, yttrium oxide, lanthanum oxide, and cerium oxide. Many of these metal-containing sintering aids are described in Negita, "Effective Sintering Aids for Silicon Carbide Ceramics: Reactivities of Silicon Carbide with Various Additives," 69 J. Am. Ceram. Soc. C-308 (1986). Other metal-containing sintering aids suggested by Negita might also be effective in the practice of this invention. Preferred sintering aids are selected from the group consisting of boron, boron-containing compounds, aluminum, and aluminum-containing compounds. Examples of boron-containing sintering aids include boron carbide, lithium borohydride, trivinylboron, triphenylboron, silicon hexaboride, and the like. Examples of aluminum-containing sintering aids include aluminum oxide, aluminum nitride, aluminum diboride, and the like. The most preferred sintering aids are boron and boron carbide. Mixtures of sintering aids may also be used.

If used, the sintering aid is generally present at an amount less than about 3.0 weight percent of the metal based on the weight of the silicon carbide powder. If the concentration is above about 0.1%, care must be taken to either limit the free carbon content to less than about 0.1% (discussed above) and/or limit the temperature to about 1800° C. or below.

The mixture of the present invention is formed by merely combining the above components in a manner that assures a uniform mixture. Such a mixture is required to avoid areas of varying density throughout the sintered product. Uniform mixtures can be prepared by using conventional blending techniques such as wet or dry grinding or ultrasonic dispersion. Other mixing and grinding methods will be apparent to those skilled in the art.

The uniform mixture may then be formed into the desired shape. Preferably, the desired shape is formed under pressure using such methods as injection molding, uniaxial pressing, isopressing, extrusion, transfer molding, and the like.

The formed composition is preferably cured to facilitate its final shaping (e.g., machining, turning, lathing, etc.) prior to sintering. Curing procedures are well known in the art and are dependent on the curing agent selected. If heat is to be used, generally the temperature is in the range of about 50° to 300° C.

After the body has been shaped and, optionally, cured, the body can be handled and machined as desired. This aspect of the invention is particularly advantageous since prior art approaches generally produce weak green bodies which must be ceramified before machining. Clearly, machining of ceramic parts is much more difficult than green bodies.

Once the final shape has been obtained, the article is sintered in an inert atmosphere to a temperature of 1600° C. or more. The preferred sintering temperature is about 1600° to 2200° C. with about 1700°-2000° C. being most preferred. Sintering may be carried out using either a pressureless sintering process or a hot press sintering process. Generally, however, the pressureless sintering process is preferred because of the simplified operations involved.

The sintering step is carried out under an inert atmosphere such as nitrogen, argon, helium, or vacuum (e.g., 0.1-200 torr) to prevent oxygen incorporation into the ceramic. The use of nitrogen may often be preferred since it slows the growth of alpha-SiC grains and decreases the rate of sintering.

Sintering may be performed in any conventional high temperature furnace equipped with a means to control the furnace atmosphere. Such furnaces are well known in the art and many are commercially available.

The temperature schedule for sintering depends on both the volume of parts to be fired and the composition of the mixture. For smaller parts, the temperature may be raised relatively rapidly (e.g., 5°–10° C./min). For larger objects or those with large concentrations of polymer, however, more extended firing programs are needed to create uniform ceramic bodies (e.g., 2°–5° C./min). Generally, the part is held at temperature for up to about 4 hours.

As noted above, it is known that when molded ceramics containing greater than about 0.1 wt % sintering aid and greater than about 0.1 wt % free carbon are heated to temperatures above about 1800° C. they form dense ceramic bodies. As described hereinbefore, the present inventors have discovered that by limiting the carbon and/or boron content below these concentrations they can form strong porous bodies. Similarly, the inventors have discovered that if the amount of boron and free carbon are above this level, the temperature should be less than about 1800° C. to form porous bodies.

By the above methods, high strength, porous silicon carbide ceramics with densities less than 2.4 g/cm$^3$ are formed. These ceramics have porosities greater than about 25%, 3 pt bending strengths greater than about 25 ksi and Young's modulus above about 10 msi. They are useful in a variety of applications such as filters, catalyst supports and dynamic parts requiring stiffness at low density.

So that those skilled in the art can better appreciate and understand the invention, the following examples are given. Unless otherwise indicated, all percentages are by weight. Throughout this specification "Me" represents a methyl group, "Ph" represents a phenyl group, and "Vi" represents a vinyl group.

In the following examples, the analytical methods used were as follows:

Carbon analysis was done on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry.

Compounding was done on a Hauschild dental mixer. A 12 ton Hull console molding machine (model 359E) was used for transfer molding. Test bars were formed on a Carver laboratory press (Fred S. Carver Inc., Summit, N.J.) using a tungsten carbide lined die. Pyrolysis was carried out in an Astro graphite element tube furnace Model 1000-3060-FP12 equipped with an Eurotherm Controller/Programmer Model 822. Flex strengths (using the four-point bend technique) were determined on either a Model TTC or Model 8562 Instron instrument.

The SiC powders used was Ibiden UF SiC ("Ibiden"), which contains a mixture of about 5 to 8% alpha-SiC and 92 to 95% beta-SiC. The boron used was amorphous boron powder from Cerac Inc. The boron carbide (Tetrabor) was from Elektroschmelzwerk Kempten Gnbh., Munich, West Germany.

EXAMPLE 1

A—Polymer Synthesis

A mixture of 476 g (2.4 moles) PhSi(OMe)$_3$, 286 g (2.1 moles) MeSi(OMe)$_3$, and 138 g (0.74 moles) (ViMe$_2$-

Si)₂O was added to a solution of 4 g of trifluoromethane sulfonic acid in 400 g of water. After about 20 minutes the mixture was refluxed for 12 hours. The mixture was cooled and then neutralized with 4 g of potassium carbonate. The volatiles were removed by distillation until a temperature of 90° C. was reached. The product was cooled and 700 g of toluene and 70 g of a 3 wt. % solution of KOH in water was added. The solution was refluxed and the water removed in a Dean-Stark trap. After all the water was removed, the residue was cooled and 27 g Me₂ViSiCl added. After stirring at room temperature for approximately 2 hours, the residue was filtered through a 0.2 micron membrane filter and the filtrate concentrated via rotary evaporation. The residue was dried for approximately 1-2 hours at 100° C. and 1 torr. The yield was 590 g.

B—Polymer Pyrolysis and Char Composition Calculations

A mixture of 10 g of the above polymer and 0.1 g Lupersol catalyst (2,5-bis(t-butylperoxy)-2,3-dimethylhexane) was prepared. An aliquot of the mixture was crosslinked at 200° C. for 1 hour. An aliquot of the crosslinked polymer was weighed into a graphite crucible. The crucible was transferred into an Astro tube furnace. The furnace was evacuated to <20 torr and then backfilled with argon. This backfill procedure was repeated twice. Under a purge of argon the sample was heated to 1900° C. (room temperature to 1200° C. at 13° C./min and 1200°-1900° C. at 5° C./minute) and held at temperature for two hours before cooling to room temperature. The sample had a mass retention of 43% and contained 37.83% carbon and 58.1% silicon. The following calculations were made: 100 g of cured polymer gives 43 g of a ceramic char consisting of 37.83% carbon and 58.1% silicon (by difference). (In order to simplify the calculations, the amount of oxygen—typically <0.1%—has been ignored.) The char consists of 37 g SiC and 4.8 g excess carbon. Therefore, each gram of polymer, after pyrolysis, gives 0.37 g SiC and 0.048 g free carbon.

C—Test Bar Fabrication

Two siloxane/SiC powder blends were prepared using the following procedure: A sample of the siloxane prepared above was dissolved in toluene in a glass flask by stirring for several minutes. To this solution is added the Lupersol TM curing agent followed by mixing. The silicon carbide powder was then added to the solution and mixed via sonic mixing for 10 minutes. The mixture was then stripped via rotary evaporation, dried, ground and sieved through 325 mesh. The sieved powder was dry pressed into test bars at approximately 20-35 ksi and cured. The test bars were fired to various temperatures in an Astro tube furnace (argon atmosphere). The porosity, density, strength, microstructure and young's modulus of the fired test bars were measured. The results obtained are shown in Table 1:

| Blend 1: | Ibiden ultrafine beta-SiC Powder | 84.85 g |
|---|---|---|
| | Siloxane | 15 g |
| | Lupersol TM | 0.15 g |
| Blend 2: | Ibiden ultrafine beta-SiC powder | 89.9 g |
| | Siloxane | 10 g |
| | Lupersol | 0.1 g |

TABLE 1

| Blend | Green Density* | Firing Temp °C. | Fired Density* | Open Porosity# | Linear Shrinkage | 3pt Bend Strength* | Young's Modulus* |
|---|---|---|---|---|---|---|---|
| 1 | 2.21 | 1600 | 2.13 | 33.0% | 1.20% | 25 ± 10 | 12.6 |
| | | 1800 | 2.12 | 33.2% | 1.35% | 32 ± 3 | 15.1 |
| | | 2000 | 2.15 | 31.9% | 1.69% | 33 ± 3 | 16.3 |
| | | 2100 | 2.14 | 31.2% | 1.69% | | |
| 2 | 2.10 | 1600 | 2.06 | 35.1% | 0.97% | 30 ± 3.4 | 14.1 |
| | | 1800 | 2.06 | 35.2% | 1.08% | 30 ± 2.3 | 14.2 |
| | | 2000 | 2.07 | 34.7% | 1.42% | 28 ± 2.5 | 15.1 |
| | | 2100 | 2.11 | 33.5% | 1.38% | | |

*Density in g/cm³; Strength in ksi; Modulus in msi (msi = mpsi = million psi)
Porosity measured by liquid immersion test

EXAMPLE 2

A—Polymer Synthesis

A mixture of 3690 g (18.64 moles) PhSi(OMe)₃ and 620 g (3.33 moles) (ViMe₂Si)₂O was added to a solution of 3 g of trifluoromethane sulfonic acid in 800 g of water. After about 20 minutes the mixture was refluxed for 5 hours. The mixture was cooled and then neutralized with 2.73 g of potassium carbonate. The volatiles were removed by distillation until a temperature of 120° C. was reached. The mixture was cooled and 1500 g of toluene and 125.7 g of a 3 wt. % solution of KOH in water was added. The solution was refluxed and the water removed in a Dean-Stark trap. After all the water was removed, the residue was cooled and 20 mL Me₂ViSiCl added. After stirring at room temperature for approximately 2 hours, the residue was filtered through a 0.2 micron membrane filter and the filtrate concentrated via rotary evaporation. The residue was dried for approximately 1-2 hours at 100° C. and <1 torr. The yield was 3053.3 g.

B—Polymer Pyrolysis and Char Composition Calculations

A mixture of 14.85 g of the above polymer, 5.16 g Ph₂Si(OSiMe₂H)₂ and 0.01 g Lupersol catalyst (2,5-bis(t-butylperoxy)-2,3-dimethylhexane) was prepared. An aliquot of the mixture was crosslinked at 120° C. for 1 hour. An aliquot of the crosslinked polymer was weighed into a graphite crucible. The crucible was transferred into an Astro tube furnace. The furnace was evacuated to <20 torr and then backfilled with argon. This backfill procedure was repeated twice. Under a purge of argon the sample was heated to 1900° C. (room temperature to 1200° C. at 13° C./min and 1200°-1900° C. at 5° C./minute) and held at temperature for two hours before cooling to room temperature. The sample had a mass retention of 44.9% and contained 53.4% carbon. The following calculations were made: 100 g of cured polymer gives 44.9 g of a ceramic char consisting of 53.4% carbon and 46.6% silicon (by difference). (In order to simplify the calculations, the amount of oxygen has been ignored.) The char consists of 29.9 g SiC and 15 g excess carbon. Therefore, each gram of polymer, after pyrolysis, gives 0.299 g SiC and 0.15 g free carbon.

C—Test Bar Fabrication

Three siloxane/SiC powder blends were prepared using the following procedure: A sample of the siloxane prepared above was dissolved in toluene in a glass flask by stirring for several minutes. To this solution is added the Lupersol ™ curing agent and the sintering aid followed by mixing. The silicon carbide powder was then added to the solution and mixed via sonic mixing for 10 minutes. The mixture was then stripped via rotary evaporator, dried, ground and sieved through 325 mesh. The sieved powder was dry pressed into test bars at approximately 20–35 ksi and cured. The test bars were fired to various temperatures in an Astro tube furnace (argon atmosphere). The porosity, density, strength, microstructure and young's modulus of the fired test bars were measured. The results obtained are shown in Table 2:

| Blend 3: | Ibiden ultrafine beta-SiC Powder | 675 g |
|---|---|---|
| | Siloxane | 95.59 g |
| | | 12.84 g |
| | Lupersol ™ | 3.09 g |
| | Amorphous boron | 3.38 g (0.5%) |
| (formed into ≦ 400 mesh spray dried granules) | | |
| Blend 4: | Ibiden ultrafine beta-SiC Powder | 100 g |
| | Siloxane | 21.25 g |
| | | 3.04 g |
| | Lupersol ™ | 0.70 g |
| | Boron Carbide | 0.15 g (0.15%) |
| Blend 5: | Ibiden ultrafine beta-SiC Powder | 149.6 g |
| | Siloxane | 21.25 g |
| | | 3.01 g |
| | Lupersol ™ | 0.70 g |
| | Boron Carbide | 0.08 g (0.05%) | stirred with 5.3 g (0.05 mole) of Me$_2$ViSiCl, filtered through a 0.2 micron membrane and stripped in vacuo at 150° C. to give a soft resin.

Cross-linker Synthesis

A mixture of 683 g Ph$_2$Si(OMe)$_2$, 630 g of a (MeHSiO)$_n$ fluid and 61 g of (Me$_3$Si)$_2$O was added to a solution of 2.25 g of trifluoromethane sulfonic acid in 190 g of water and 2 kg of toluene. After approximately 20 minutes, the mixture was refluxed for 2 hours. The mixture was cooled and then neutralized with 2.73 g of potassium carbonate. 900 g of volatiles were removed by distillation until a temperature of 110° C. was reached. The remaining volatiles were removed by azeotroping to a pot temperature of 120° C. The solution was filtered and rotary evaporated to yield 1100 g of a high molecular weight Si-H functional siloxane fluid.

B—Polymer Pyrolysis and Char Composition Calculations

A mixture of 10.0 g of the above polymer, 1.85 g of the Si-H functional siloxane fluid and 0.15 g Lupersol catalyst (2,5-bis(t-butylperoxy)-2,3-dimethylhexane) was prepared. An aliquot of the blend was cross-linked at 180° C. for 1 hour. An aliquot of the crosslinked polymer was weighed into a graphite crucible. The crucible was transferred into an Astro tube furnace. The furnace was evacuated to <20 torr and then backfilled with argon. This backfill procedure was repeated twice. Under a purge of argon the sample was heated to 1800° C. at 10° C./min and held at temperature for 1 hour before cooling to room temperature. The sample had a mass retention of 43.8% and contained 37.5% carbon. The following calculations were made: 100 g of cured polymer gives 43.8 g of a ceramic char consisting of 37.5% carbon and 62.5% silicon (by difference). (In order to simplify the calculations, the amount of oxygen has been ignored.) The char consists of 36.97 g SiC and 4.83 g excess carbon. Therefore, each gram of polymer, after pyrolysis, gives 0.370 g SiC and 0.048 g free carbon.

TABLE 2

| Blend | Green Density* | Firing Temp °C. | Fired Density* | Open Porosity# | Linear Shrinkage | 3pt Bend Strength* | Young's Modulus* |
|---|---|---|---|---|---|---|---|
| 3 | 2.16 | 1600 | 2.14 | 32.5% | 1.87% | 21 | <10 |
| | | 1800 | 2.34 | 26.2% | 4.91% | 37 | 16.6 |
| | | 1900 | 2.86 | 9.5% | 11.41% | 63 | 32.9 |
| 4 | 2.20 | 1800 | 2.18 | 31.8% | 1.87% | 33 | 12.8 |
| | | 1900 | 2.19 | 31.5% | 2.05% | 35 | 15.2 |
| | | 1995 | 2.25 | 29.2% | 2.89% | 31 | 16.3 |
| | | 2070 | 2.32 | 26.2% | 3.81% | 36 | 17.2 |
| | | 2100 | 2.37 | 25.1% | 4.96% | | |
| 5 | 2.16 | 1800 | 2.15 | 31.8% | 2.05% | 29 | 12.7 |
| | | 1900 | 2.16 | 31.7% | 2.35% | 33 | 13.1 |
| | | 1995 | 2.19 | 30.4% | 2.44% | 31 | 14.4 |
| | | 2070 | 2.20 | 29.6% | 2.76% | 35 | 15.7 |
| | | 2100 | 2.19 | 30.6% | 2.45% | | |
| 3** | 2.16 | 1800 | 2.18 | 24.2% | 2.13% | 23 | 10.2 |
| | | 1900 | 2.43 | 18.1% | 5.88% | 54 | 19.6 |
| | | 1995 | 2.53 | 16.5% | 7.66% | 50 | 22.2 |
| | | 2070 | 2.69 | 11.5% | 9.26% | 72 | 26.9 |
| | | 2100 | 2.74 | 10.5% | 9.71% | 67 | 29.3 |

*Density in g/cm$^3$; Strength in ksi; Modulus in msi
**Fired in nitrogen

EXAMPLE 3

A. Polymer Synthesis

To a three-necked 5 L flask equipped with a drainage stopcock, thermometer, condenser and addition funnel was added 895 g of water and 162 g of isopropyl alcohol. A mixture of 10.45 g (0.07 moles) of Me SiCl$_3$, 30.94 g (0.24 mole) of Me$_2$SiCl$_2$, 4.34 g (0.04 mole) of Me$_3$SiCl, 21.13 g (0.15 mole) of MeViSiCl$_2$ and 105.7 g (0.50 mole) of PhSiCl$_3$ in 390 g of toluene was added below the water surface over a six minute period. After stirring for 30 minutes the water layer was drained. The resin layer was washed with 2 1 L portions of water. The resin layer was dried and concentrated in vacuo to approximately 60% solids. This solution was then C—Test Bar Fabrication In a 60 mL bowl of a Hauschild Dental Mixer was place 86 g Ibiden UF-SiC powder, 21 g of the resin described above and 4 g of the Si-H functional fluid described above. The mixer was run at 4 times 10 seconds at which time the mixing was stopped and the material allowed to cool for 5 minutes. 0.5 g Lupersol ™ was then added and the mixing continued for 2 times 6 seconds and the material removed. This mixture was transfer molded into a 12 cavity test bar mold (each cavity=6.2×37.8×2.5 mm) at 195° C. with a ram pressure of 1250 psi and clamping pressure of 1850 psi. The test bars were fired to 1800°, 1900°, 2000°, 2100°, and 2200° C. in an argon atmosphere using the following ramp rate: room temperature to 1200° C. at 2.55° C./min, a 19 minute hold, 1200°–1400° C. at 2.5° C./min under vacuum, 1400-maximum at 2.5° C./min with a 60 minute hold at maximum, and maximum −1200° C. at 5° C./minute. The characterization of these test bars is provided in Table 3.

EXAMPLE 4

B—Polymer Pyrolysis and Char Composition Calculations

A mixture of 10.0 g of the polymer described in Example 3, 1.85 g of a fluid prepared from $Si(OEt)_4$ and $(Me_2HSi)_2O$ and 0.15 g Lupersol catalyst (2,5-bis(t-butylperoxy)-2,3-dimethylhexane) was prepared. An aliquot of the blend was cross-linked at 180° C. for 1 hour. An aliquot of the crosslinked polymer was weighed into a graphite crucible. The crucible was transferred into an Astro tube furnace. The furnace was evacuated to <20 torr and then backfilled with argon. This backfill procedure was repeated twice. Under a purge of argon the sample was heated to 1800° C. at 10° C./min and held at temperature for 1 hour before cooling to room temperature. The sample had a mass retention of 42.34% and contained 33.26 % carbon. The following calculations were made: 100 g of cured polymer gives 42.34 g of a ceramic char consisting of 33.26% carbon and 66.74% silicon (by difference). (In order to simplify the calculations, the amount of oxygen has been ignored.) The char consists of 40.37 g SiC and 1.97 g excess carbon. Therefore, each gram of polymer, after pyrolysis, gives 0.4037 g SiC and 0.0197 g free carbon.

C—Test Bar Fabrication

In a 60 mL bowl of a Hauschild Dental Mixer was place 86 g Ibiden UF-SiC powder, 21 g of the resin described above and 4 g of the fluid described above. The mixer was run at 4 times 10 seconds at which time the mixing was stopped and the material allowed to cool for 5 minutes. 0.5 g Lupersol TM was then added and the mixing continued for 2 times 6 seconds and the material removed. This mixture was transfer molded into a 12 cavity test bar mold (each cavity=6.2×37.8×2.5 mm) at 195° C. with a ram pressure of 1250 psi and clamping pressure of 1850 psi. The test bars were fired to 1800°, 1900°, 2000°, 2100°, and 2200° C. in an argon atmosphere using the following ramp rate: room temperature to 1200° C. at 2.55° C./min, a 19 minute hold, 1200°–1400° C. at 2.5° C./min under vacuum, 1400-maximum at 2.5° C./min with a 60 minute hold at maximum, and maximum −1200° C. at 5° C./minute. The characterization of these test bars is provided in Table 3.

TABLE 3

| Ex No | Firing Temp °C. | Density (g/cc) | Shrinkage | 4 pt Bend Strength (ksi) |
|---|---|---|---|---|
| 3 | cured | 2.24 | | 5.84 ± 1.16 |
| | 1800 | 2.05 | 2.23% | 19.9 ± 3.8 |
| | 1900 | 2.10 | | 23.9 ± 2.7 |
| | 2000 | 2.07 | 2.48% | 12.0 ± 1.0 |
| | 2100 | 2.08 | 2.56% | 13.6 ± 2.4 |
| | 2200 | 2.09 | 3.25% | 13.2 ± 2.3 |
| 4 | cured | 2.25 | | 5.18 ± 0.80 |
| | 1800 | 2.04 | 2.41% | 18.6 ± 3.7 |
| | 1900 | 2.05 | 2.58% | 21.6 ± 3.2 |
| | 2000 | 2.05 | 2.53% | 12.0 ± 1.0 |
| | 2100 | 2.06 | 2.74% | 16.1 ± 4.4 |
| | 2200 | 2.03 | 3.23% | 13.3 ± 2.3 |

That which is claimed is:

1. A porous body which was heated above 1600° C., comprising silicon carbide having a density less than 2.4 $g/cm^3$, an open porosity greater than 25% and a 3 point bending strength greater than 25 Ksi.

* * * * *